(12) United States Patent
Morioka et al.

(10) Patent No.: US 11,137,558 B2
(45) Date of Patent: Oct. 5, 2021

(54) OPTICAL RECEPTACLE AND OPTICAL MODULE

(71) Applicant: Enplas Corporation, Saitama (JP)

(72) Inventors: Shimpei Morioka, Saitama (JP); Ayano Kon, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 16/920,799

(22) Filed: Jul. 6, 2020

(65) Prior Publication Data

US 2021/0003793 A1    Jan. 7, 2021

(30) Foreign Application Priority Data

Jul. 3, 2019  (JP) .............................. JP2019-124596

(51) Int. Cl.
*G02B 6/42*    (2006.01)

(52) U.S. Cl.
CPC ......... *G02B 6/4246* (2013.01); *G02B 6/4214* (2013.01); *G02B 6/4215* (2013.01)

(58) Field of Classification Search
CPC .. G02B 6/4206; G02B 6/4212; G02B 6/4214; G02B 6/4215; G02B 6/4246; H04B 10/40; H04B 10/43; H04B 10/2503; H04B 10/2504
USPC ........................................ 385/33, 47, 88–92
See application file for complete search history.

(56) References Cited

U.S. PATENT DOCUMENTS

| | | | |
|---|---|---|---|
| 8,335,411 B2* | 12/2012 | Kuznia | G01N 21/55 385/33 |
| 8,676,006 B2* | 3/2014 | Morioka | G02B 6/425 385/33 |
| 2009/0252503 A1 | 10/2009 | Ishigami | |

FOREIGN PATENT DOCUMENTS

JP           2009-251375 A       10/2009

* cited by examiner

*Primary Examiner* — Michael P Mooney
(74) *Attorney, Agent, or Firm* — Brundidge & Stanger, P.C.

(57) ABSTRACT

An optical receptacle includes an optical receptacle main body and a filter. The optical receptacle main body includes a first optical surface, a second optical surface, a third optical surface, and a reflecting surface. The filter includes a first filter that reflects light of a first wavelength and allows light of a second wavelength to pass therethrough, and a second filter that reflects the light of the second wavelength and allows the light of the first wavelength to pass therethrough. The filter is disposed on the optical receptacle main body such that the first filter or the second filter makes intimate contact with the reflecting surface. A second central axis of the second optical surface do not coincide with a light axis of a light-receiving element. A third central axis of the third optical surface do not coincide with a light axis of a light-emitting element.

6 Claims, 9 Drawing Sheets

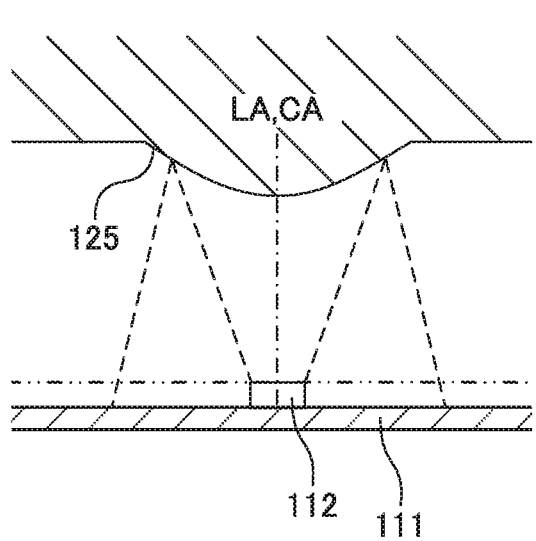
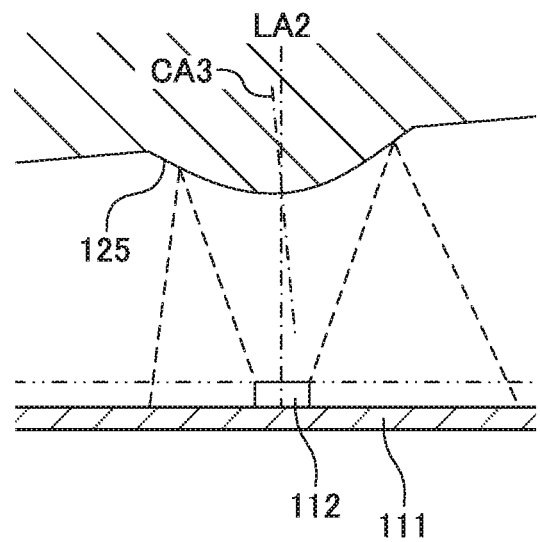
FIG.7A  FIG.7C
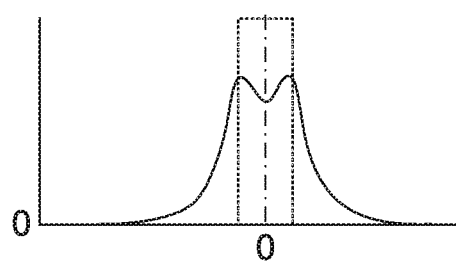
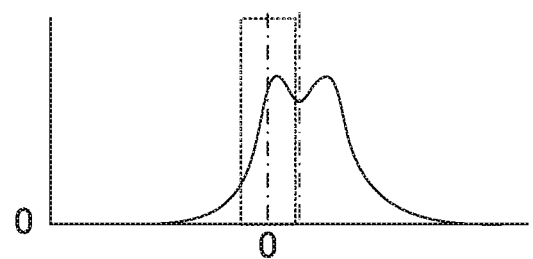
FIG.7B  FIG.7D

OPTICAL RECEPTACLE AND OPTICAL MODULE

CROSS REFERENCE TO RELATED APPLICATIONS

This application is entitled to and claims the benefit of Japanese Patent Application No. 2019-124596, filed on Jul. 3, 2019, the disclosure of which including the specification, drawings and abstract is incorporated herein by reference in its entirety.

TECHNICAL FIELD

The present invention relates to an optical receptacle and an optical module.

BACKGROUND ART

In the related art, an optical module (optical transmission module) including a light-emitting element such as a light-emitting diode and a light-receiving element such as a photodetector is used for optical communications using an optical transmission member such as such as an optical fiber and an optical waveguide. The optical module includes an optical receptacle (optical member) that causes light including communication information emitted from the light-emitting element to enter the end surface of the optical transmission member, and causes light including communication information emitted from the optical transmission member to enter the light-receiving surface of light-receiving element (see, for example, PTL 1).

PTL 1 discloses an optical transmission module including an optical element assembly including an optical element for transmission and an optical element for reception, an optical fiber, and an optical member. The optical member causes an optical signal from the optical element for transmission to enter the optical fiber, or causes an optical signal from the optical fiber to enter the optical element for reception. The optical member includes a lens for transmission disposed to face the optical element for transmission, a lens for fiber disposed to face the optical fiber, a lens for reception disposed to face the optical element for reception, an optical filter that reflects, toward the lens for fiber, the signal light entered from the lens for transmission, or allows, to pass therethrough, the reception light entered from the lens for fiber, and a reflecting surface that reflects, toward the lens for reception, the reception light passed through the optical filter. The optical filter is disposed facing a filter mounting surface of a filter mounting part, and is fixed with a transparent adhesive agent to fill the filter mounting part.

CITATION LIST

Patent Literature

PTL 1

Japanese Patent Application Laid-Open No. 2009-251375

SUMMARY OF INVENTION

Technical Problem

However, with the optical element assembly disclosed in PTL 1, the filter mounting part for installing the optical filter and the reflecting surface disposed at a position spaced from the filter mounting part are required to be provided to the optical member. Consequently, the light path between the optical fiber and the optical element for reception is lengthened, and the size of the optical transmission module is increased. In addition, complete conversion to collimated light using the lens for fiber may not be achieved in the case where an optical fiber in which the diameter of the end surface of the core is large is used, for example. When reception light cannot be converted to collimated light, and the light path between the optical fiber and the optical element for reception is long, the light coupling efficiency between the end surface of the optical fiber and the light-receiving surface of the optical element for reception is significantly reduced.

In addition, since the central axis of the lens for transmission is disposed to coincide with the light axis of the optical element for transmission, a part of the light emitted from the optical element for transmission is reflected by the lens for transmission and reaches the optical element for transmission as return light. When the light reflected by the lens for transmission reaches the light-emitting surface of the optical element for transmission, the intensity distribution of the light emitted from the optical element for transmission may be disturbed.

An object of the present invention is to provide an optical receptacle and an optical module that can maintain high light coupling efficiency and can reduce return light of light emitted from a light-emitting element even in the case where an optical transmission member whose core has a large end surface is used.

Advantageous Effects of Invention

An optical receptacle according to an embodiment of the present invention is configured to optically couple an optical transmission member, a light-emitting element and a light-receiving element when the optical receptacle is disposed between the optical transmission member configured to emit light of a first wavelength and a photoelectric conversion device including the light-emitting element and the light-receiving element, the light-emitting element being configured to emit light of a second wavelength different from the first wavelength, the light-receiving element being configured to receive the light of the first wavelength, the optical receptacle including an optical receptacle main body; and a filter disposed on the optical receptacle main body, wherein the optical receptacle main body includes: a first optical surface configured to allow incidence of the light of the first wavelength emitted from the optical transmission member, or to emit, toward the optical transmission member, the light of the second wavelength that has travelled inside the optical receptacle main body, a second optical surface configured to emit, toward the light-receiving element, the light of the first wavelength that has travelled inside the optical receptacle main body, or to allow incidence of the light of the second wavelength emitted from the light-emitting element, a third optical surface disposed at a position father from the first optical surface than the second optical surface, the third optical surface being configured to emit, toward the light-receiving element, the light of the first wavelength that has travelled inside the optical receptacle main body, or to allow incidence of the light of the second wavelength emitted from the light-emitting element, and a reflecting surface disposed on a light path between the first optical surface and the second optical surface, the reflecting surface being configured to internally reflect, toward the first optical surface, the light of the second wavelength entered from the second optical surface, or to internally reflect, toward the second optical surface, the light of the first wavelength entered from the first optical surface, wherein the second optical surface is disposed such that a second central axis of the second optical surface does not coincide with a first light axis of the light-emitting element or a second light axis of the light-receiving element, wherein the third optical surface is disposed such that a third central axis of the third optical surface does not coincide with the first light axis or the second light axis, wherein the filter includes: a first filter surface disposed in one surface of the filter, the first filter surface being configured to reflect the light of the first wavelength and to allow the light of the second wavelength to pass through the first filter surface, and a second filter surface disposed in another surface of the filter, the second filter surface being configured to reflect the light of the second wavelength and to allow the light of the first wavelength to pass through the second filter surface, wherein when the second optical surface emits the light of the first wavelength toward the light-receiving element, or when the third optical surface allows incidence of the light of the second wavelength, the filter is disposed on the optical receptacle main body such that the first filter surface makes intimate contact with the reflecting surface, the second filter surface reflects, toward the first optical surface, the light of the second wavelength entered from the third optical surface, and the reflecting surface and the first filter surface reflect, toward the second optical surface, the light of the first wavelength entered from the first optical surface, or allow, to pass through the reflecting surface and the first filter surface toward the first optical surface, the light of the second wavelength reflected by the second filter surface, wherein when the second optical surface allows incidence of the light of the second wavelength, or when the third optical surface emits, toward the light-receiving element, the light of the first wavelength, the filter is disposed on the optical receptacle main body such that the second filter surface makes intimate contact with the reflecting surface, and the reflecting surface and the second filter surface reflect, toward the first optical surface, the light of the second wavelength entered from the second optical surface, or allow, to pass through the reflecting surface and the second filter surface toward the first filter surface, the light of the first wavelength entered from the first optical surface, and wherein the first filter surface reflects, toward the third optical surface, the light of the first wavelength that has passed through the second filter surface.

An optical module according to an embodiment of the present invention includes a photoelectric conversion device including a substrate, a light-emitting element disposed on the substrate, and a light-receiving element disposed on the substrate; and the optical receptacle according, wherein the light-emitting element is disposed such that the first light axis of the light-emitting element is parallel to a normal to a surface of the substrate, and wherein the light-receiving element is disposed such that the second light axis of the light-receiving element is parallel to the normal to the surface of the substrate.

Brief Description of Drawings

According to the present invention, it is possible to provide an optical receptacle and an optical module that can maintain high light coupling efficiency and can reduce return light of light emitted from a light-emitting element even in the case where an optical transmission member whose core has a large end surface is used.

BRIEF DESCRIPTION OF DRAWINGS

Figure 1:
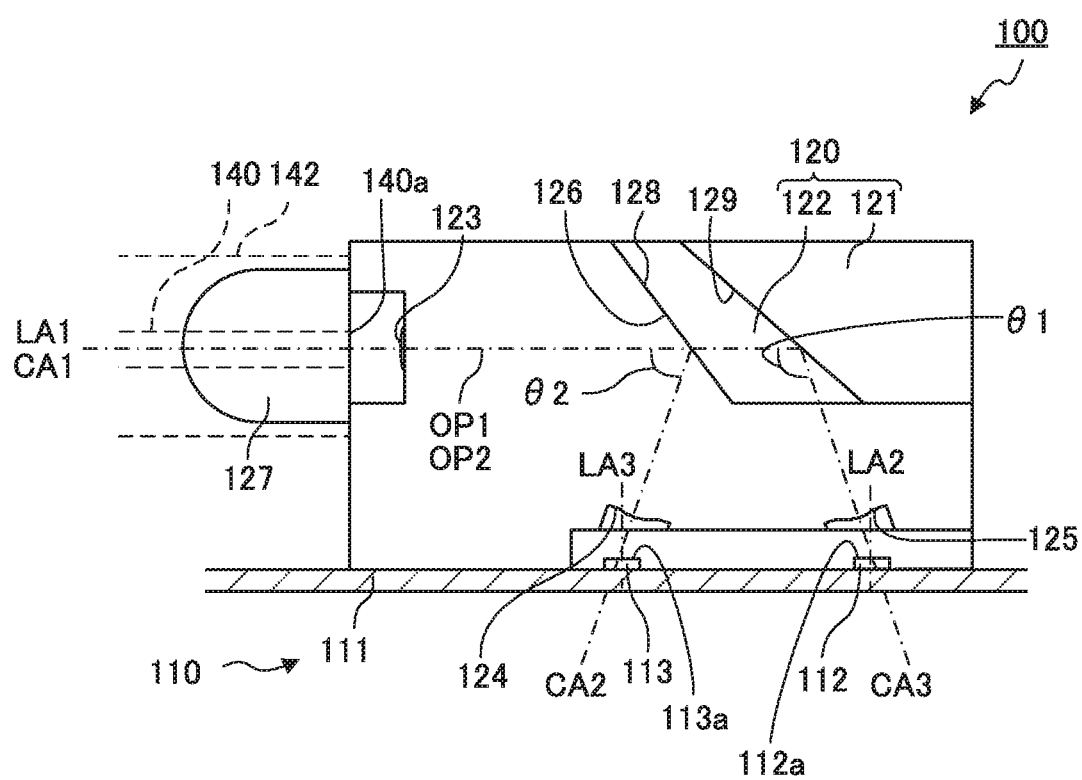
Figure 3:
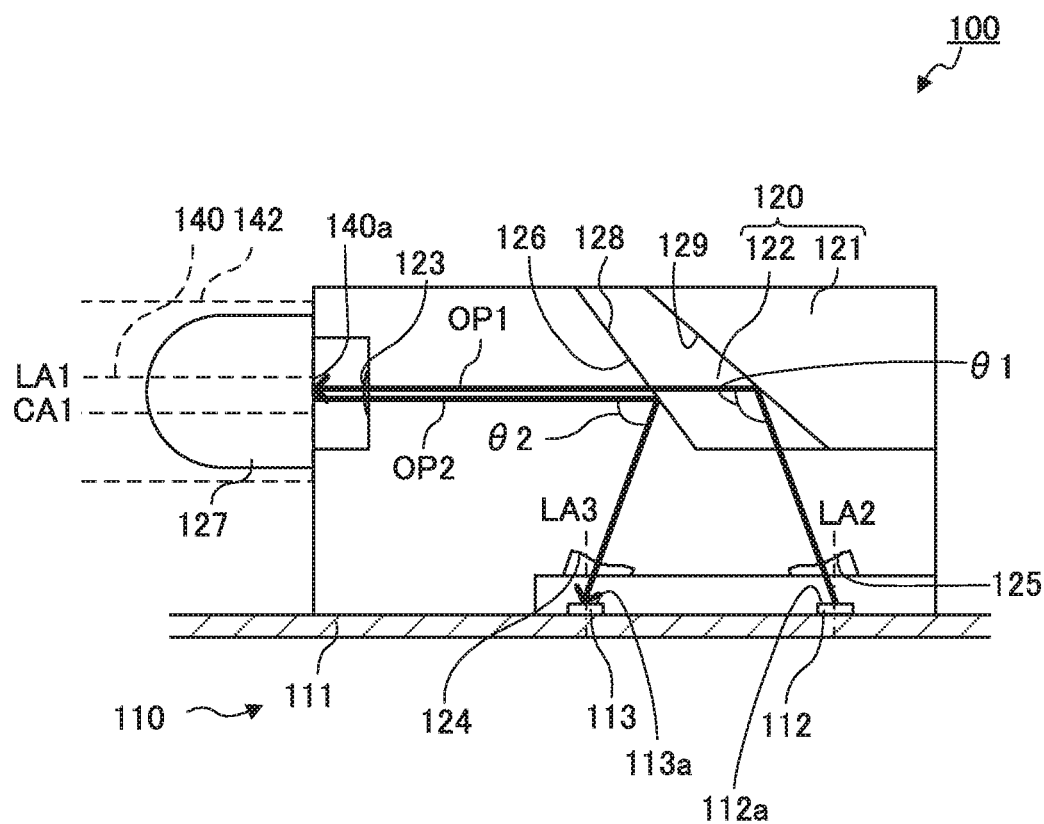
Figure 4A:
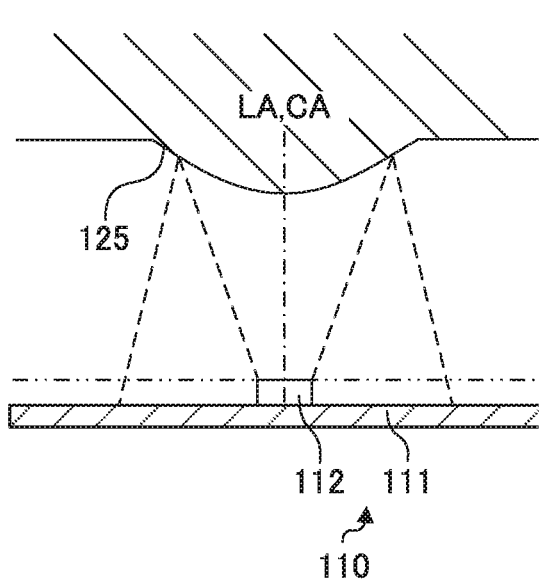
Figure 4C:
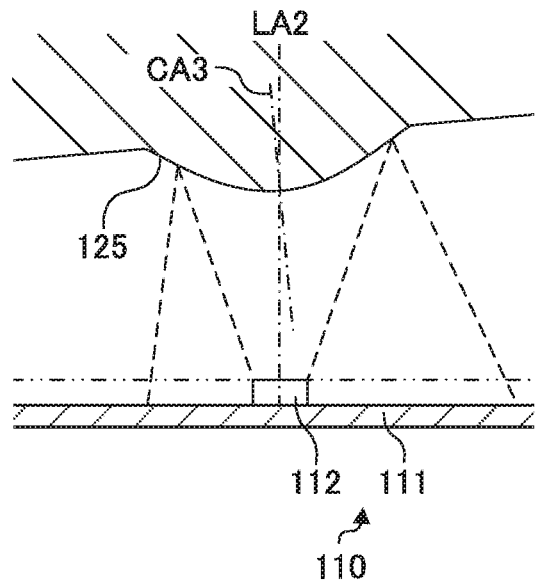
Figure 4B:
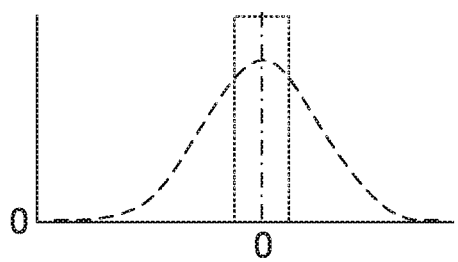
Figure 4D:
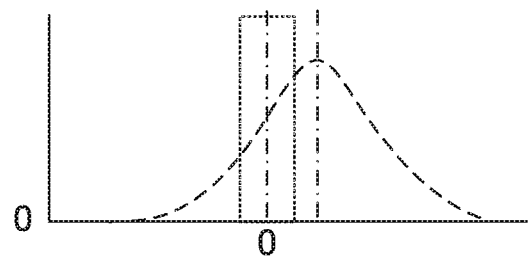
Figure 5A:
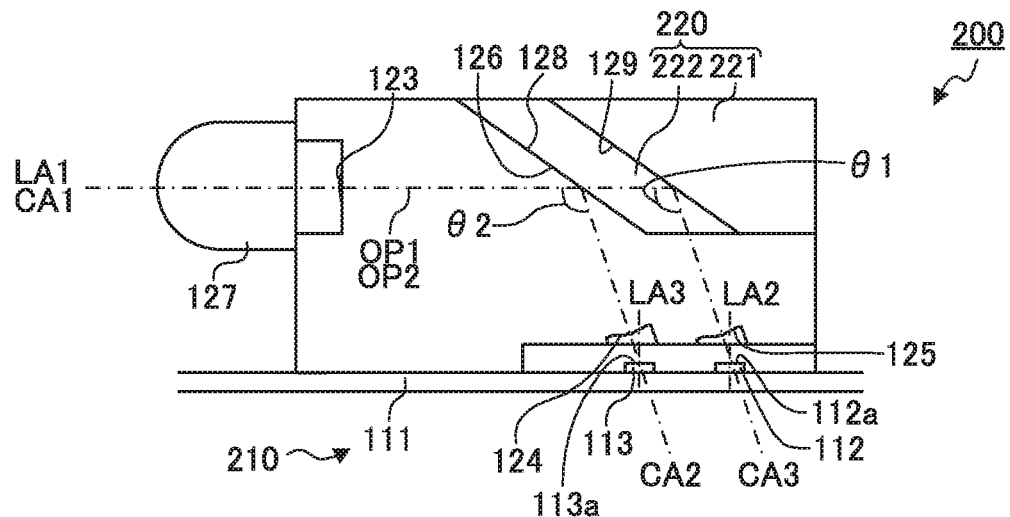
Figure 5B:
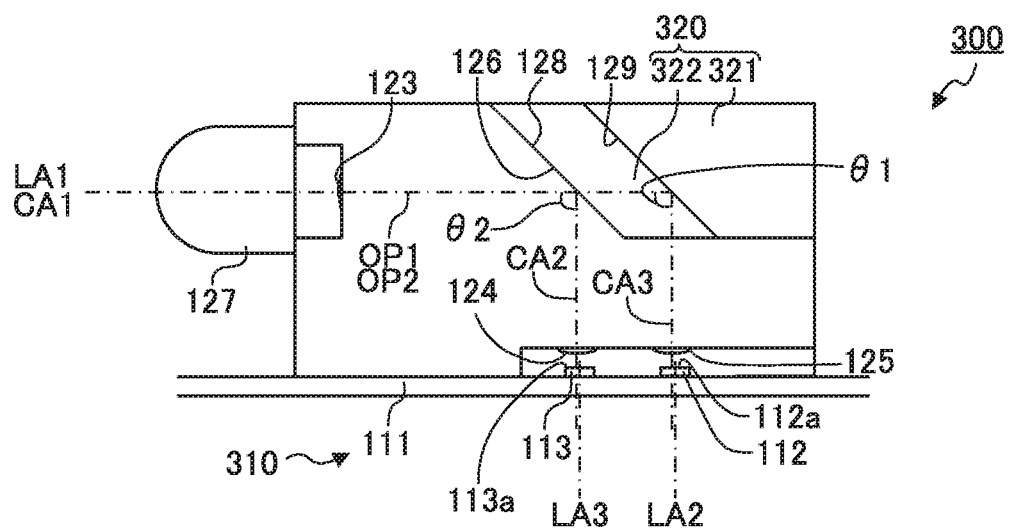
Figure 6A:
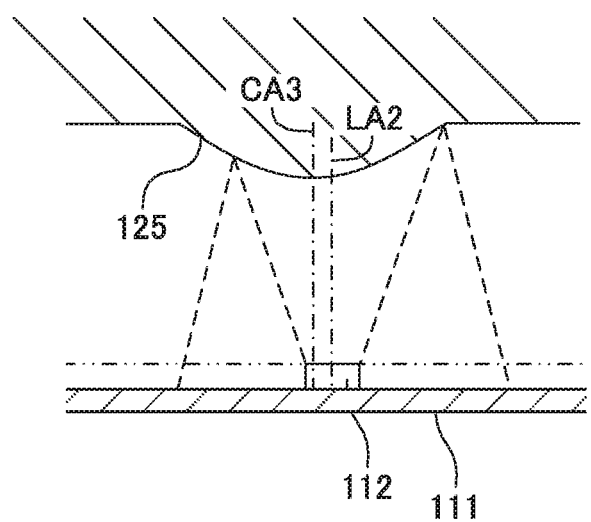
Figure 6B:
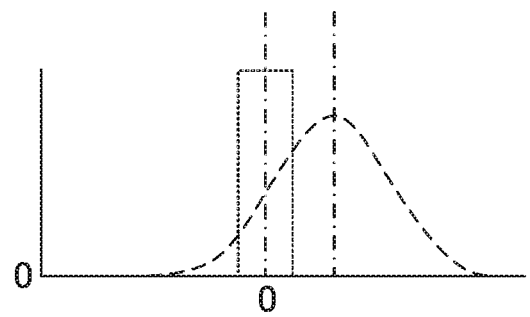
Figure 8A:
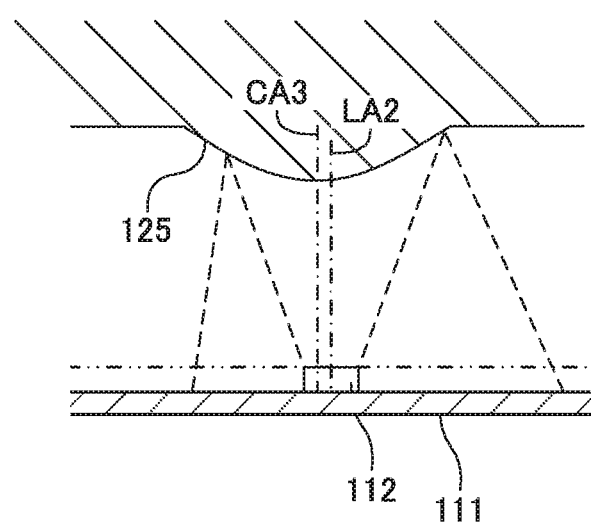
Figure 8B:
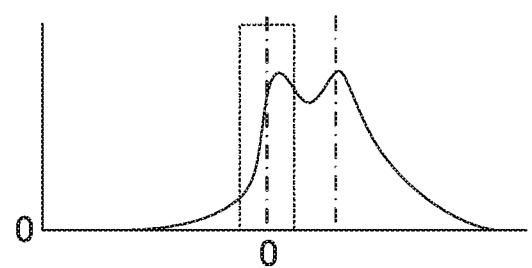
Figure 9:
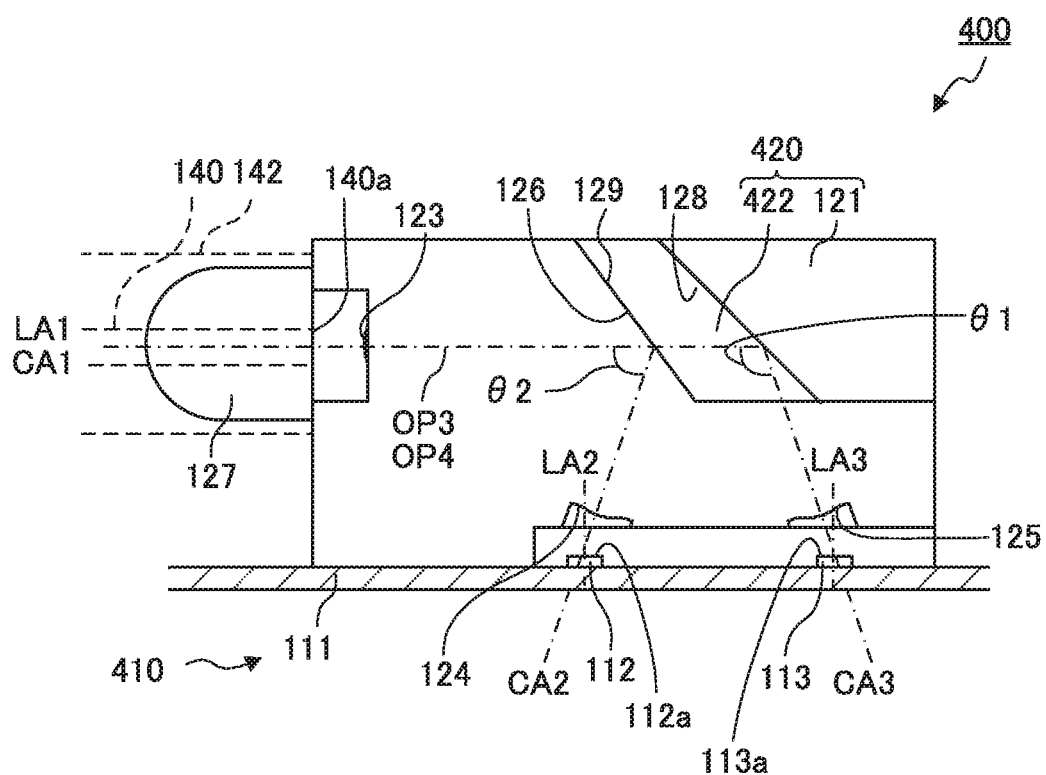

FIG. 1 is a sectional view of an optical module according to Embodiment 1 of the present invention;
FIGS. 2A to 2D illustrate a configuration of an optical receptacle according to Embodiment 1;
FIG. 3 is a diagram for describing an arrangement of a light-emitting element with respect to an optical transmission member, and an arrangement of a light-receiving element with respect to the optical transmission member;
FIGS. 4A to 4D are diagrams for describing return light in optical modules of a comparative example and Embodiment 1;
FIGS. 5A and 5B are sectional views of optical modules according to modifications of Embodiment 1;
FIGS. 6A and 6B are diagrams for describing return light in an optical module of a modification in Embodiment 1;
FIGS. 7A to 7D are diagrams for describing return light in an optical module of another modification in Embodiment 1;
FIGS. 8A and 8B are diagrams for describing return light in an optical module of another modification in Embodiment 1; and
FIG. 9 is a sectional view of an optical module according to Embodiment 2 of the present invention.

DESCRIPTION OF EMBODIMENTS

An optical module according to embodiments of the present invention will be described below with reference to the accompanying drawings.

Embodiment 1

Configuration of Optical Module

FIG. 1 is a sectional view of optical module 100 according to Embodiment 1 of the present invention. In FIG. 1, optical transmission member 140 and ferrule 142 are indicated by broken lines. In FIG. 1, hatching on optical receptacle main body 121 and filter 122 is omitted to illustrate the central axis of the optical surface and the light axis.

As illustrated in FIG. 1, optical module 100 includes photoelectric conversion device 110 of a substrate mounting type, and optical receptacle 120. Optical module 100 is used with optical transmission member 140 coupled (hereinafter referred to also as "connected") to optical receptacle 120. Optical module 100 according to the present embodiment can be used for single-core bidirectional communication. In this case, optical module 100 detects light (reception light) of a first wavelength emitted from end surface 140a of the core of optical transmission member 140, and emits light (transmission light) of a second wavelength different from the first wavelength to end surface 140a of the core of optical transmission member 140.

Photoelectric conversion device 110 includes substrate 111, light-emitting element 112, and light-receiving element 113.

Substrate 111 supports light-emitting element 112 and light-receiving element 113, and also supports optical receptacle 120. Substrate 111 is, for example, a glass composite substrate, a glass epoxy substrate, a flexible substrate, or a ceramic substrate composed of alumina or the like. Light-emitting element 112 and light-receiving element 113 are disposed on substrate 111.

Light-emitting element 112 is disposed on substrate 111, and emits light of the second wavelength. The second wavelength is, for example, 800 to 1000 nm, or 1200 to 1600 nm although the second wavelength is not limited as long as the second wavelength is different from the first wavelength and single-core bidirectional communication can be appropriately performed. The light-emitting element is, for example, a light-emitting diode, or a vertical-cavity surface-emitting laser (VCSEL). The distribution of the light emission intensity of the light emitted from light-emitting element 112 may be a unimodal distribution or a bimodal distribution.

The number of light-emitting elements 112 is not limited. In the present embodiment, twelve light-emitting elements 112 are provided. In addition, in the present embodiment, the size of end surface 140a of the core of optical transmission member 140 is greater than the size of light-emitting surface 112a of light-emitting element 112.

Light-emitting element 112 may be disposed such that first light axis LA2 of light-emitting element 112 is parallel to the normal to the surface of substrate 111, or is tilted with respect to the normal. That is, first light axis LA2 of light-emitting element 112 does not coincide with the normal to the surface of substrate 111. From the viewpoint of easy installation, it is preferable that light-emitting element 112 is disposed such that first light axis LA2 of light-emitting element 112 is parallel to the normal to the surface of substrate 111. Here, "first light axis LA2" means the normal to light-emitting surface 112a that passes through light-emitting surface 112a of light-emitting element 112.

Light-receiving element 113 receives the light of the first wavelength emitted from end surface 140a of the core of optical transmission member 140. Light-receiving element 113 is a photodetector, for example. The number of light-receiving elements 113 is not limited, and may be selected in accordance with the configuration of optical receptacle 120. In the present embodiment, twelve light-receiving elements 113 are provided (see FIG. 2C). In addition, in the present embodiment, in association with the configuration in which the size of end surface 140a of the core of optical transmission member 140 is greater than the size of light-emitting surface 112a of light-emitting element 112 (described later), light-receiving element 113 is disposed at a position closer to optical transmission member 140 than light-emitting element 112.

Light-receiving element 113 may be disposed such that light axis (second light axis) LA3 of light-receiving element 113 is parallel to the normal to the surface of substrate 111, or may be tilted with respect to the normal. That is, second light axis LA3 of light-receiving element 113 does not coincide with the normal to the surface of substrate 111. From the viewpoint of easy installation, it is preferable that light-receiving element 113 is disposed such that second light axis LA3 of light-receiving element 113 is parallel to the normal to the surface of substrate 111. Here, "second light axis LA3" means the normal to light-receiving surface 113a that passes through the center of light-receiving surface 113a of light-receiving element 113.

Optical receptacle 120 is disposed on substrate 111 of photoelectric conversion device 110. When disposed between photoelectric conversion device 110 and optical transmission member 140, optical receptacle 120 optically couples end surface 140a of the core of optical transmission member 140, light-emitting surface 112a of light-emitting element 112 and light-receiving surface 113a of light-receiving element 113. In the present embodiment, optical receptacle 120 optically couples end surfaces 140a of the cores of twelve optical transmission members 140, light-emitting surfaces 112a of twelve light-emitting elements 112 and light-receiving surfaces 113a of twelve light-receiving elements 113. The configuration of optical receptacle 120 will be elaborated later.

The type of optical transmission member 140 is not limited. Examples of the type of optical transmission member 140 include an optical fiber, and an optical waveguide. In the present embodiment, optical transmission member 140 is an optical fiber. The optical fiber may be of a single mode type, or a multiple mode type. The first wavelength of the light (reception light) emitted from end surface 140a of the core of optical transmission member 140 is, for example 800 to 1000 nm, or 1200 to 1600 nm, but is not limited as long as the first wavelength is different from the second wavelength and single-core bidirectional communication can be appropriately performed. The number of optical transmission members 140 is not limited, and may be selected in accordance with the configuration of optical receptacle 120. In the present embodiment, twelve optical transmission members 140 are provided. In addition, in the present embodiment, optical transmission member 140 is connected to optical receptacle 120 with ferrule 1 therebetween.

Configuration of Optical Receptacle

Figure 2A:
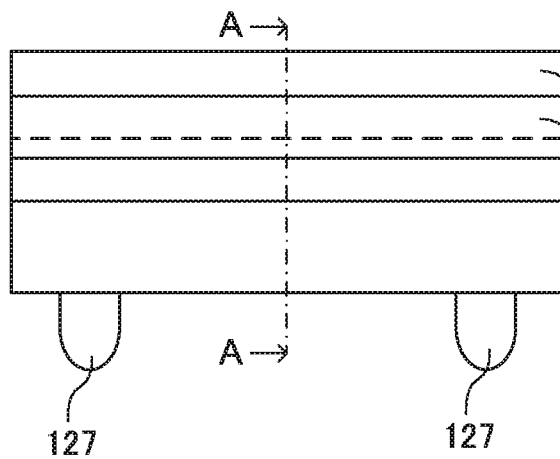
Figure 2D:
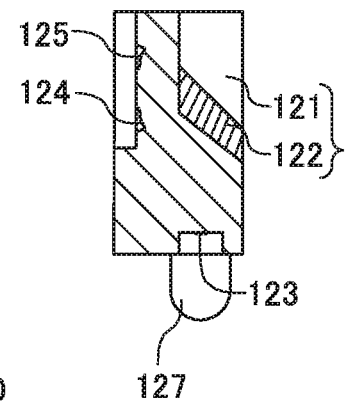
Figure 2B:
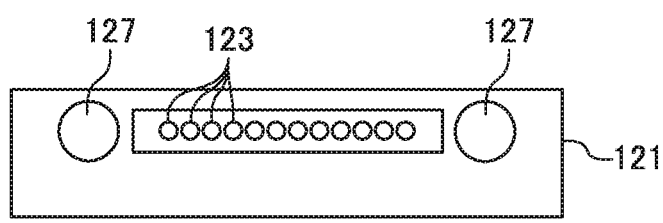
Figure 2C:
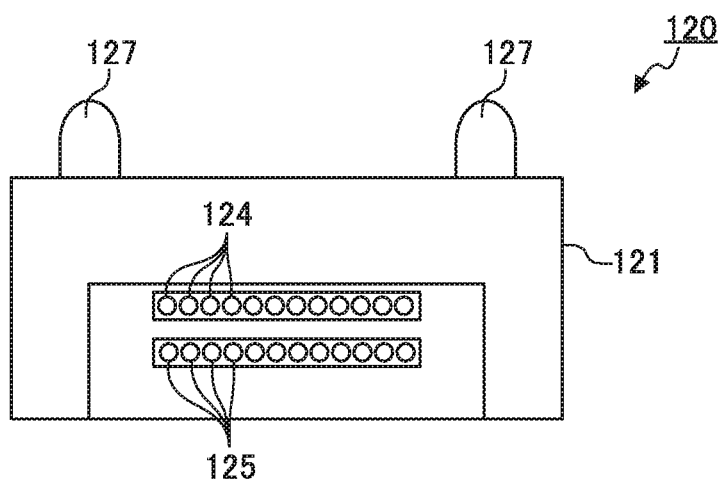

FIGS. 2A to 2D illustrate a configuration of optical receptacle 120. FIG. 2A is a plan view of optical receptacle 120, FIG. 2B is a front view of optical receptacle 120, FIG. 2C is a bottom view of optical receptacle 120, and FIG. 2D is a sectional view taken along line A-A of FIG. 2A.

Optical receptacle 120, which is optically transparent, emits light (reception light) of the first wavelength emitted from end surface 140a of the core of optical transmission member 140 toward light-receiving surface 113a of light-receiving element 113, and emits light (transmission light) of the second wavelength emitted from light-emitting surface 112a of light-emitting element 112 toward end surface 140a of the core of optical transmission member 140. As illustrated in FIGS. 2A to 2D, optical receptacle 120 includes optical receptacle main body 121 and filter 122.

Optical receptacle main body 121 includes first optical surface 123, second optical surface 124, third optical surface 125, and reflecting surface 126. In the present embodiment, twelve first optical surfaces 123, twelve second optical surfaces 124, and twelve third optical surfaces 125 are provided. In the present embodiment, optical receptacle main body 121 further includes positioning part 127 for setting the position of optical transmission member 140.

Optical receptacle main body 121 is formed using a material that is optically transparent to the light of the wavelength used for optical communications. Examples of such a material include transparent resins such as polyetherimide (PEI) and cyclic olefin resin. In addition, optical receptacle main body 121 is produced by injection molding, for example.

First optical surface 123 is an optical surface that allows the light of the first wavelength emitted from end surface 140a of the core of optical transmission member 140 to enter optical receptacle main body 121, and emits, toward end surface 140a of the core of optical transmission member 140, the light that has travelled inside optical receptacle main body 121. The shape of first optical surface 123 is not limited. First optical surface 123 may be a convex lens surface protruding toward optical transmission member 140, a concave lens surface recessed with respect to optical transmission member 140, or a flat surface. In the present embodiment, first optical surface 123 is a convex lens surface protruding toward optical transmission member 140. The shape in plan view of first optical surface 123 is not limited. The shape in plan view of first optical surface 123 may be a circular shape, or a polygonal shape. In the present embodiment, first optical surface 123 has a circular shape in plan view.

First central axis CA1 of first optical surface 123 may or may not coincide with light axis LA1 of the light of the first wavelength emitted from end surface 140a of the core of optical transmission member 140. That is, first central axis CA1 of first optical surface 123 may or may not coincide with the central axis (light axis LA1) of end surface 140a of the core of optical transmission member 140. In the present embodiment, first central axis CA1 of first optical surface 123 coincides with the central axis (light axis LA1) of end surface 140a of the core of optical transmission member 140 (see FIG. 1).

Second optical surface 124 is an optical surface that is disposed at a position closer to first optical surface 123 than third optical surface 125, so as to face light-emitting element 112 or light-receiving element 113. In the present embodiment, second optical surface 124 faces light-receiving element 113, and emits, toward light-receiving element 113, the light of the first wavelength that has travelled inside optical receptacle main body 121. The shape of second optical surface 124 is not limited. Second optical surface 124 may be a convex lens surface protruding toward light-receiving element 113, a concave lens surface recessed with respect to light-receiving element 113, or a flat surface. In the present embodiment, second optical surface 124 is a convex lens surface protruding toward light-receiving element 113. The shape in plan view of second optical surface 124 is not limited. The shape in plan view of second optical surface 124 may be a circular shape, or a polygonal shape. In the present embodiment, second optical surface 124 has a circular shape in plan view.

Second optical surface 124 is disposed such that second central axis CA2 of second optical surface 124 does not coincide with second light axis LA3 of light-receiving element 113. More specifically, second central axis CA2 of second optical surface 124 is disposed such that second central axis CA2 is tilted with respect to second light axis LA3 of light-receiving surface 113a of light-receiving element 113, or is disposed such that second central axis CA2 and second light axis LA3 are parallel to each other and do not coincide with each other. In the present embodiment, second central axis CA2 of second optical surface 124 is disposed such that second central axis CA2 is tilted with respect to second light axis LA3 of light-receiving surface 113a of light-receiving element 113. More specifically, in the present embodiment, second light axis LA3 of light-receiving surface 113a of light-receiving element 113 is parallel to the normal to the surface of substrate 111 as described above. Accordingly, second central axis CA2 of second optical surface 124 is tilted away from optical transmission member 140 in the direction from the bottom surface to the top surface of optical receptacle main body 221, or is tilted toward optical transmission member 140 in the direction from the bottom surface to the top surface of optical receptacle main body 221. In the present embodiment, second central axis CA2 of second optical surface 124 is tilted away from optical transmission member 140 in the direction from the bottom surface to the top surface of optical receptacle main body 221.

The inclination angle of second central axis CA2 of second optical surface 124 with respect to second light axis LA3 of light-receiving surface 113a of light-receiving element 113 is not limited. The inclination angle is preferably 0.1 to 23 degrees from the viewpoint of reducing return light that is reflected by light-receiving surface 113a toward end surface 140a of the core of optical transmission member 140.

Reflecting surface 126 is an inclined surface formed on the top surface side of optical receptacle main body 121, and is disposed on a light path between first optical surface 123 and second optical surface 124. Reflecting surface 126 is configured to internally reflect, toward second optical surface 124, the light entered from first optical surface 123, and to internally reflect, toward first optical surface 123, the light entered from second optical surface 124. In the present embodiment, reflecting surface 126 is a flat surface tilted toward first optical surface 123 in the direction from the bottom surface toward the top surface of optical receptacle 120. The inclination angle of reflecting surface 126 can be appropriately adjusted in accordance with the light path of the light emitted from optical transmission member 140 and the light path of the light emitted from light-emitting element 112.

Note that, as described later, reflecting surface 126 makes intimate contact with first filter surface 128 or second filter surface 129 of filter 122. When first filter surface 128 is in intimate contact with reflecting surface 126, reflecting surface 126 and first filter surface 128 reflect the light of the first wavelength and allow the light of the second wavelength to pass therethrough. On the other hand, when second filter surface 129 is in intimate contact with reflecting surface 126, reflecting surface 126 and second filter surface 129 reflect the light of the second wavelength and allow the light of the first wavelength to pass therethrough. In the present embodiment, first filter surface 128 is in intimate contact with the reflecting surface, and reflecting surface 126 and first filter surface 128 reflect, toward second optical surface 124, the light of the first wavelength entered from first optical surface 123, and allow, to pass therethrough toward first optical surface 123, the light of the second wavelength entered from third optical surface 125 and reflected by second filter surface 129 (see FIG. 3).

Third optical surface 125 is an optical surface that is disposed at a position farther from first optical surface 123 than second optical surface 124, so as to face light-emitting element 112 or light-receiving element 113. In the present embodiment, third optical surface 125 faces light-emitting element 112, and allows incidence of the light of the second wavelength emitted from light-emitting element 112. The shape of third optical surface 125 is not limited. Third optical surface 125 may be a convex lens surface protruding toward light-emitting element 112, a concave lens surface recessed with respect to light-emitting element 112, or a flat surface. In the present embodiment, third optical surface 125 is a convex lens surface protruding toward light-emitting element 112. The shape in plan view of third optical surface 125 is not limited. The shape in plan view of third optical surface 125 may be a circular shape or a polygonal shape. In the present embodiment, third optical surface 125 has a circular shape in plan view.

Third optical surface 125 is disposed such that third central axis CA3 of third optical surface 125 does not coincide with first light axis LA2 of light-emitting element 112. More specifically, third central axis CA3 of third optical surface 125 is disposed such that third central axis CA3 is tilted with respect to first light axis LA2 of light-emitting surface 112*a* of light-emitting element 112, or is disposed such that third central axis CA3 and first light axis LA2 are parallel relative to each other and do not coincide with each other. In the present embodiment, third central axis CA3 of third optical surface 125 is tilted with respect to first light axis LA2 of light-emitting surface 112*a* of light-emitting element 112. More specifically, in the present embodiment, first light axis LA2 of light-emitting surface 112*a* of light-emitting element 112 is parallel to the normal to the surface of substrate 111 as described above. Accordingly, third central axis CA3 of third optical surface 125 is tilted away from optical transmission member 140 in the direction from the bottom surface to the top surface of optical receptacle main body 221, or is tilted toward optical transmission member 140 in the direction from the bottom surface to the top surface of optical receptacle main body 221. In the present embodiment, third central axis CA3 of third optical surface 125 is tilted toward optical transmission member 140 in the direction from the bottom surface to the top surface of optical receptacle main body 221.

The inclination angle of third central axis CA3 of third optical surface 125 with respect to first light axis LA2 of light-emitting surface 112*a* of light-emitting element 112 is not limited. The inclination angle is preferably 0.1 to 23 degrees from the viewpoint of reducing return light reflected by third optical surface 125 toward light-emitting surface 112*a* of light-emitting element 112.

Positioning part 127 sets the position of end surface 140*a* of the core of optical transmission member 140 with respect to optical receptacle main body 121. The configuration of positioning part 127 is not limited as long as the above-mentioned function can be ensured. In the present embodiment, positioning part 127 is a protrusion having a substantially columnar shape. By fitting positioning part 127 to a positioning hole formed in ferrule 142, the position of end surface 140*a* of the core of optical transmission member 140 is set with respect to optical receptacle main body 121.

Filter 122 is disposed on reflecting surface 126 at a position on the light path between first optical surface 123 and second optical surface 124, and on the light path between first optical surface 123 and third optical surface 125.

Filter 122 includes first filter surface 128 disposed on one side and second filter surface 129 disposed on the other side. First filter surface 128 reflects the light of the first wavelength, and allows the light of the second wavelength to pass therethrough. Second filter surface 129 reflects the light of the second wavelength, and allows the light of the first wavelength to pass therethrough. The shapes of first filter surface 128 and second filter surface 129 are each complementary to reflecting surface 126. In the present embodiment, first filter surface 128 and second filter surface 129 are flat surfaces. First filter surface 128 and second filter surface 129 may be or may not be parallel to each other. In the present embodiment, the cross-sectional shape of filter 122 is a trapezoid. One surface corresponding to a leg of the trapezoid includes first filter surface 128, and the other surface includes second filter surface 129. In the state where first filter surface 128 is in intimate contact with reflecting surface 126, second filter surface 129 is disposed such that second filter surface 129 is located on intersection of first central axis CA1 of first optical surface 123 and third central axis CA3 of third optical surface 125, and second filter surface 129 is tilted such that the light entered from first optical surface 123 is internally reflected toward third optical surface 125 and that the light entered from third optical surface 125 is internally reflected toward first optical surface 123. The inclination angles of first filter surface 128 and second filter surface 129 may be appropriately adjusted in accordance with the light path of the light emitted from optical transmission member 140 and the light path of the light emitted from light-emitting element 112.

Filter 122 is disposed on optical receptacle main body 121 such that first filter surface 128 or second filter surface 129 makes intimate contact with reflecting surface 126. When first filter surface 128 is in intimate contact with reflecting surface 126, reflecting surface 126 and first filter surface 128 reflect the light of the first wavelength and allow the light of the second wavelength to pass therethrough. When second filter surface 129 is in intimate contact with reflecting surface 126, reflecting surface 126 and second filter surface 129 reflect the light of the second wavelength and allow the light of the first wavelength to pass therethrough (see Embodiment 2).

In the present embodiment, first filter surface 128 is in intimate contact with reflecting surface 126, and reflecting surface 126 and first filter surface 128 are disposed on the intersection of the first central axis CA1 of first optical surface 123 and second central axis CA2 of second optical surface 124. In addition, second filter surface 129 is disposed on the intersection of first central axis CA1 of first optical surface 123 and third central axis CA3 of third optical surface 125. Reflecting surface 126 and first filter surface 128 reflect, toward second optical surface 124, the light of the first wavelength entered from first optical surface 123, and allow, to pass therethrough toward first optical surface 123, the light of the second wavelength entered from third optical surface 125 and reflected by second filter surface 129 (see FIG. 3). Second filter surface 129 reflects, toward first optical surface 123, the light of the second wavelength entered from third optical surface 125.

The configuration of filter 122 is not limited as long as the above-mentioned function can be ensured. For example, filter 122 is obtained by forming a coating (e.g., a semiconductor multilayer film) that reflects the light of the first wavelength and allows the light of the second wavelength to pass therethrough on one surface of a substrate made of resin or glass, and by forming a coating (e.g., a semiconductor multilayer film) that reflects the light of the second wavelength and allow the light of the first wavelength to pass therethrough on the other surface. Although the refractive index of the substrate is not limited, it is preferable that the refractive index of substrate is close to the refractive index of the material (e.g., resin) of optical receptacle main body 121, and it is more preferable that the refractive index of substrate is the same as that of the material of optical receptacle main body 121.

In the present embodiment, the light of the second wavelength emitted from light-emitting surface 112*a* of light-emitting element 112 enters optical receptacle main body 121 from third optical surface 125. The light entered from third optical surface 125 passes through the interface between optical receptacle main body 121 and filter 122 and is reflected by second filter surface 129 of filter 122 toward first optical surface 123. The light reflected by second filter surface 129 passes through first filter surface 128 and reflecting surface 126, and is emitted from first optical surface 123 toward end surface 140*a* of the core of optical transmission member 140. In this manner, the light of the second wavelength emitted from light-emitting element 112 reaches optical transmission member 140 through third optical surface 125, second filter surface 129, and first optical surface 123 (see FIG. 3).

On the other hand, the light of the first wavelength emitted from end surface 140a of the core of optical transmission member 140 enters optical receptacle main body 121 from first optical surface 123, and is reflected by reflecting surface 126 (and first filter surface 128) toward second optical surface 124. The light reflected by reflecting surface 126 is emitted from second optical surface 124 toward light-receiving surface 113a of light-receiving element 113. In this manner, the light of the first wavelength emitted from optical transmission member 140 reaches light-receiving element 113 through first optical surface 123, reflecting surface 126 (first filter surface 128), and second optical surface 124 (see FIG. 3).

Now, an arrangement of light-emitting element 112 with respect to optical transmission member 140 and an arrangement of light-receiving element 113 with respect to optical transmission member 140 are described. FIG. 3 is a diagram for describing an arrangement of light-emitting element 112 with respect to optical transmission member 140 and an arrangement of light-receiving element 113 with respect to optical transmission member 140. In FIG. 3, the hatching on optical receptacle main body 121 and filter 122 is omitted to illustrate light paths.

As illustrated in FIG. 3, the light path between light-emitting surface 112a of light-emitting element 112 and end surface 140a of the core of optical transmission member 140 is referred to as first light path OP1, and the light path between end surface 140a of the core of optical transmission member 140 and light-receiving surface 113a of light-receiving element 113 is referred to as second light path OP2.

In the case where light emitted from an emission surface (e.g., end surface 140a of the core of optical transmission member 140 or light-emitting surface 112a of light-emitting element 112) is guided by optical receptacle 120 to a light-receiving surface (e.g., light-receiving surface 113a of light-receiving element 113 or end surface 140a of the core of optical transmission member 140), the light coupling efficiency between the emission surface and the light-receiving surface tends to be lower as the emission surface increases. In addition, the light coupling efficiency tends to be lower as the length of the light path increases. For this reason, in the present embodiment, the size of light-emitting surface 112a of light-emitting element 112 and the size of end surface 140a of the core of optical transmission member 140 are compared with each other, and the positions of light-emitting element 112 and light-receiving element 113 and the arrangement of filter 122 are set such that the length of the light path of the light emitted from the emission surface that is larger than the other is shorter. In the present embodiment, as described above, the size of end surface 140a of the core of optical transmission member 140 is equal to or greater than the size of light-emitting surface 112a of light-emitting element 112. Accordingly, light-receiving element 113 is disposed to face second optical surface 124 such that second light path OP2 is shorter than first light path OP1. In this case, the light emitted from optical transmission member 140 passes through second light path OP2, and reaches light-receiving element 113. Here, since second light path OP2 is shorter than first light path OP1, the light coupling efficiency with respect to light-receiving element 113 can be maintained even in the case where end surface 140a of the core of optical transmission member 140 is large. Note that in the case where the size of end surface 140a of the core of optical transmission member 140 is smaller than the size of light-emitting surface 112a of light-emitting element 112, it is preferable that light-emitting element 112 is disposed to face second optical surface 124 (see Embodiment 2).

Next, a relationship between emission light emitted from light-emitting element 112 and return light that reaches light-emitting element 112 is described. Note that, for the sake of comparison, an optical module according to a comparative example in which central axis CA of third optical surface 125 and light axis LA of light-emitting element 112 coincide with each other is also described. Here, the intensity distribution of the light emitted from light-emitting element 112 is assumed to be unimodal (a distribution close to the Gaussian distribution). FIG. 4A illustrates a positional relationship between light-emitting element 112 and third optical surface 125 in an optical module of a comparative example. FIG. 4B is a graph illustrating the intensity of return light in the optical module of the comparative example. FIG. 4C illustrates a positional relationship between light-emitting element 112 and third optical surface 125 in optical module 100 of the present embodiment. FIG. 4D is a graph illustrating the intensity of return light in the optical module according to the present embodiment. In FIGS. 4A and 4C, the diameter of light emitted from the end portion of light-emitting surface 112a of light-emitting element 112 is indicated by broken lines. In FIGS. 4B and 4D, the abscissa indicates the distance from the center of light-emitting surface 112a of light-emitting element 112, and the ordinate indicates the intensity (illuminance) of return light. In addition, the intensity of return light is the intensity of light that reaches a virtual plane at the same height as light-emitting surface 112a of light-emitting element 112 after being emitted from light-emitting element 112 and reflected by third optical surface 125.

As illustrated in FIG. 4A, in the optical module of the comparative example, central axis CA of third optical surface 125 and light axis LA of light-emitting element 112 coincide with each other. A part of the light emitted from light-emitting element 112 is reflected by third optical surface 125 toward photoelectric conversion device 110. Since the intensity distribution of the light emitted from light-emitting element 112 is an intensity distribution close to the Gaussian distribution, the intensity distribution of the return light reflected by third optical surface 125 is also an intensity distribution similar to the Gaussian distribution. Accordingly, as illustrated in FIG. 4B, light with higher intensity reaches light-emitting element 112 compared to other regions.

On the other hand, as illustrated in FIG. 4C, in optical module 100 of the present embodiment, third central axis CA3 of third optical surface 125 and first light axis LA2 of light-emitting element 112 do not coincide with each other. More specifically, third central axis CA3 of third optical surface 125 is tilted with respect to first light axis LA2 of light-emitting element 112. Also in this case, since the intensity distribution of the light emitted from light-emitting element 112 is an intensity distribution close to the Gaussian distribution, the intensity distribution of the light reflected by third optical surface 125 is also an intensity distribution similar to the Gaussian distribution. However, since third central axis CA3 of third optical surface 125 is tilted with respect to first light axis LA2 of light-emitting element 112, the return light having the highest intensity is located at a region other than light-emitting surface 112a of light-emitting element 112. That is, the return light having the highest intensity does not reach light-emitting surface 112a of light-emitting element 112. With this configuration, the optical module according to the present embodiment can reduce the return light compared to the optical module of the comparative example.

Effect

As described above, in optical module 100 according to the present embodiment, the size of end surface 140a of the core of optical transmission member 140 and the size of light-emitting surface 112a of light-emitting element 112 are compared with each other, and the light path of the transmission light and the light path of the reception light can be changed such that the light path of the light emitted from the surface larger than the other is shorter. Thus, even in the case where optical transmission member 140 whose end surface 140a of the core is large is used, high light coupling efficiency can be maintained.

In addition, in optical module 100 according to the present embodiment, second central axis CA2 of second optical surface 124 and second light axis LA3 of light-receiving element 113 do not coincide with each other (tilted), and third central axis CA3 of third optical surface 125 and first light axis LA2 of light-emitting element 112 do not coincide with each other (tilted), and thus, the return light that reaches light-emitting element 112 after being emitted from light-emitting element 112 can be reduced. Further, in optical receptacle 120 according to the present embodiment, reflecting surface 126 can serve its function even when filter 122 is not provided, and therefore the function as an optical receptacle for single direction communication can be achieved even with only optical receptacle main body 121 without using filter 122.

Modification

Next, optical modules 200 and 300 according to modifications of Embodiment 1 are described. FIGS. 5A and 5B are sectional views of optical modules 200 and 300 according to modifications of Embodiment 1. FIG. 5A is a sectional view of optical module 200 according to Modification 1, and FIG. 5B is a sectional view of optical module 300 according to Modification 2. In FIGS. 5A and 5B, hatching is omitted to illustrate the central axis of the optical surface and the light axis.

As illustrated in FIG. 5A, optical module 200 according to Modification 1 includes photoelectric conversion device 210 and optical receptacle 220. Optical receptacle 220 includes optical receptacle main body 221 and filter 222.

Photoelectric conversion device 210 includes substrate 111, light-emitting element 112, and light-receiving element 113. Light-receiving element 113 in the present modification is disposed at a position closer to light-emitting element 112 side compared to light-receiving element 113 of Embodiment 1.

Second optical surface 124 of optical receptacle main body 221 is disposed such that second central axis CA2 of second optical surface 124 is tilted with respect to the normal to substrate 111. Second central axis CA2 of second optical surface 124 is tilted toward optical transmission member 140 in the direction from the bottom surface to the top surface of optical receptacle main body 221.

Reflecting surface 126 is disposed on the intersection of first central axis CA1 of first optical surface 123 and second central axis CA2 of second optical surface 124, and is tilted such that the light entered from first optical surface 123 is internally reflected toward second optical surface 124 and that the light entered from second optical surface 124 is internally reflected toward first optical surface 123. The inclination angle of reflecting surface 126 with respect to substrate 111 in optical receptacle 220 according to Modification 1 (FIG. 5A) is smaller than the inclination angle (45 degrees) of reflecting surface 126 with respect to substrate 111 in optical receptacle 120 according to Embodiment 1 (FIG. 1).

Filter 222 includes first filter surface 128 and second filter surface 129. Filter 222 is disposed such that first filter surface 128 makes intimate contact with reflecting surface 126. In the present modification, the cross-sectional shape of filter 222 is a parallelogram. The inclination angle of second filter surface 129 with respect to substrate 111 in optical receptacle 220 according to Modification 1 (FIG. 5A) is smaller than the inclination angle (45 degrees) of second filter surface 129 with respect to substrate 111 in optical receptacle 120 according to Embodiment 1 (FIG. 1).

In the present modification, angle θ1 between third central axis CA3 of third optical surface 125 and the light reflected by second filter surface 129 is greater than 90 degrees. In addition, angle θ2 between first central axis CA1 of first optical surface 123 and the light reflected by reflecting surface 126 is greater than 90 degrees.

Next, optical module 300 according to Modification 2 is described. Below, differences from optical module 200 according to Modification 1 are mainly described.

As illustrated in FIG. 5B, optical module 300 according to Modification 2 includes photoelectric conversion device 310, and optical receptacle 320. Optical receptacle 320 includes optical receptacle main body 321 and filter 322.

Photoelectric conversion device 310 includes substrate 111, light-emitting element 112, and light-receiving element 113. Light-emitting element 112 is disposed such that first light axis LA2 of light-emitting element 112 is parallel to the normal to substrate 111. Light-receiving element 113 is disposed such that second light axis LA3 of light-receiving element 113 is parallel to the normal to substrate 111. The distance between light-emitting element 112 and light-receiving element 113 in photoelectric conversion device 310 of the present embodiment is shorter than the distance between light-emitting element 112 and light-receiving element 113 in photoelectric conversion device 110 of Embodiment 1.

Second optical surface 124 of optical receptacle main body 321 is disposed such that second central axis CA2 of second optical surface 124 does not coincide with second light axis LA3 of light-receiving element 113. More specifically, second optical surface 124 of optical receptacle main body 321 is disposed such that second central axis CA2 of second optical surface 124 is parallel to second light axis LA3 of light-receiving element 113 and that second central axis CA2 of second optical surface 124 does not coincide with second light axis LA3 of light-receiving element 113. Third optical surface 125 is disposed such that third central axis CA3 of third optical surface 125 does not coincide with first light axis LA2 of light-emitting element 112. More specifically, third optical surface 125 is disposed such that third central axis CA3 of third optical surface 125 is parallel to first light axis LA2 of light-emitting element 112, and that third central axis CA3 of third optical surface 125 does not coincide with first light axis LA2 of light-emitting element 112.

Reflecting surface 126 is disposed on the intersection of first central axis CA1 of first optical surface 123 and second central axis CA2 of second optical surface 124, and is tilted such that the light entered from first optical surface 123 is internally reflected toward second optical surface 124, and that the light entered from second optical surface 124 is internally reflected toward first optical surface 123. The inclination angle of reflecting surface 126 with respect to substrate 111 in optical receptacle 320 according to Modification 2 (FIG. 5B) is 45 degrees.

Filter 322 includes first filter surface 128 and second filter surface 129. Filter 322 is disposed such that first filter surface 128 makes intimate contact with reflecting surface 126. In the present modification, the cross-sectional shape of filter 322 is a parallelogram, and first filter surface 128 and second filter surface 129 are parallel to each other. In the state where first filter surface 128 is in intimate contact with reflecting surface 126, second filter surface 129 is disposed on the intersection of first central axis CA1 of first optical surface 123 and third central axis CA3 of third optical surface 125, and is tilted such that the light entered from first optical surface 123 is internally reflected toward third optical surface 125, and that the light entered from third optical surface 125 is internally reflected toward first optical surface 123. The inclination angle of second filter surface 129 with respect to substrate 111 in optical receptacle 320 according to Modification 2 (FIG. 5B) is 45 degrees.

In the present modification, angle θ1 between first light axis LA2 (third central axis CA3) and the light reflected by second filter surface 129 is 90 degrees. Also, angle θ2 between second light axis LA3 (second central axis CA2) and the light reflected by reflecting surface 126 is 90 degrees.

Now, a relationship between the emission light emitted from light-emitting element 112 and the return light that reaches light-emitting element 112 is described. Here, the intensity distribution of the light emitted from light-emitting element 112 is assumed to be unimodal (a distribution close to the Gaussian distribution). FIG. 6A illustrates a positional relationship between light-emitting element 112 and third optical surface 125 in optical module 300 of Modification 2. FIG. 6B is a graph illustrating the intensity of return light in optical module 300 of Modification 2. In FIGS. 6A and 6B, the light path of the light emitted from the end portion of light-emitting surface 112a of light-emitting element 112 is indicated by broken lines. In FIG. 6B, the abscissa indicates the distance from the center of light-emitting surface 112a of light-emitting element 112, and the ordinate indicates the intensity (illuminance) of return light. In addition, the intensity of return light is the intensity of light that reaches a virtual plane at the same height as light-emitting surface 112a of light-emitting element 112 after being emitted from light-emitting element 112 and reflected by third optical surface 125.

As illustrated in FIG. 6A, in optical module 300 of Modification 2, third central axis CA3 of third optical surface 125 and first light axis LA2 of light-emitting element 112 do not coincide with each other. A part of the light emitted from light-emitting element 112 is reflected by third optical surface 125 toward photoelectric conversion device 110. Since the intensity distribution of the light emitted from light-emitting element 112 is an intensity distribution close to the Gaussian distribution, the intensity distribution of the light reflected by third optical surface 125 is also an intensity distribution similar to the Gaussian distribution. Third central axis CA3 of third optical surface 125 and first light axis LA2 of light-emitting element 112 are parallel to each other but they do not coincide with each other, and accordingly the return light having the highest intensity is located at a region other than light-emitting surface 112a of light-emitting element 112. That is, the return light having the highest intensity does not reach light-emitting surface 112a of light-emitting element 112. With this configuration, the return light can be reduced compared to the optical module of the comparative example.

Next, a relationship between the emission light emitted from light-emitting element 112 whose distribution of light emission intensity is bimodal and the return light that reaches light-emitting element 112 in optical modules 100 and 300 according to the present embodiment is described. Note that an optical module according to a comparative example in which central axis CA of third optical surface 125 and light axis LA of light-emitting element 112 coincide with each other is also described for the sake of comparison. FIG. 7A illustrates a positional relationship between light-emitting element 112 and third optical surface 125 in the optical module of the comparative example. FIG. 7B is a graph illustrating the intensity of return light in the optical module of the comparative example. FIG. 7C illustrates a positional relationship between light-emitting element 112 and third optical surface 125 in optical module 100. FIG. 7D is a graph illustrating the intensity of return light in optical module 100. FIG. 8A illustrates a positional relationship between light-emitting element 112 and third optical surface 125 in optical module 300. FIG. 8B is a graph illustrating the intensity of return light in optical module 300.

In FIGS. 7A, 7C and 8A, light paths of the light emitted from the end portion of light-emitting surface 112a of light-emitting element 112 are illustrated by broken lines. In FIGS. 7B, 7D and 8B, the abscissa indicates the distance from the center of light-emitting surface 112a of light-emitting element 112, and the ordinate indicates the intensity (illuminance) of return light. In addition, the intensity of return light is the intensity of light that reaches a virtual plane at the same height as light-emitting surface 112a of light-emitting element 112 after being emitted from light-emitting element 112 and reflected by third optical surface 125.

As illustrated in FIG. 7A, in the optical module of the comparative example, central axis CA of third optical surface 125 and light axis LA of light-emitting element 112 coincide with each other. A part of the light emitted from light-emitting element 112 is reflected by third optical surface 125 toward photoelectric conversion device 110. The intensity distribution of the light emitted from light-emitting element 112 is an intensity distribution close to a bimodal distribution, and accordingly the intensity distribution of the light reflected by third optical surface 125 is also an intensity distribution close to a bimodal distribution. Accordingly, as illustrated in FIG. 7B, light with higher intensity reaches light-emitting element 112 compared to other regions.

As illustrated in FIG. 7C, in optical module 100, third central axis CA3 of third optical surface 125 does not coincide with first light axis LA2 of light-emitting element 112. More specifically, third central axis CA3 of third optical surface 125 is tilted with respect to first light axis LA2 of light-emitting element 112. Also in this case, the intensity distribution of the light emitted from light-emitting element 112 is an intensity distribution close to a bimodal distribution, and accordingly the intensity distribution of the light reflected by third optical surface 125 is also an intensity distribution of a bimodal distribution. However, since third central axis CA3 of third optical surface 125 is tilted with respect to first light axis LA2 of light-emitting element 112, the quantity of the light that reaches light-emitting surface 112a of light-emitting element 112 is reduced. With this configuration, the return light can be reduced compared to the optical module of the comparative example.

As illustrated in FIG. 8A, in optical module 300, third central axis CA3 of third optical surface 125 and first light axis LA2 of light-emitting element 112 do not coincide with each other. A part of the light emitted from light-emitting element 112 is reflected by third optical surface 125 toward photoelectric conversion device 110. The intensity distribution of the light emitted from light-emitting element 112 is an intensity distribution close to a bimodal distribution, and accordingly the intensity distribution of the light reflected by third optical surface 125 is also an intensity distribution of a bimodal distribution. Third central axis CA3 of third optical surface 125 and first light axis LA2 of light-emitting element 112 are parallel to each other but they do not coincide with each other, and accordingly the quantity of the light that reaches light-emitting surface 112a of light-emitting element 112 is reduced. With this configuration, the return light can be reduced compared to the optical module of the comparative example.

Embodiment 2

In Embodiment 2, a case where the size of end surface 140a of the core of optical transmission member 140 is smaller than the size of light-emitting surface 112a of light-emitting element 112 is described. In association with the configuration in which the size of end surface 140a of the core of optical transmission member 140 is smaller than the size of light-emitting surface 112a of light-emitting element 112, optical module 400 according to Embodiment 2 differs from optical module 100 according to Embodiment 1 in the arrangement of light-emitting element 112 and light-receiving element 113 and the front and rear of filter surfaces 128 and 129. As such, the components similar to those of optical module 100 according to Embodiment 1 are denoted with same reference numerals and the description thereof will be omitted.

Configuration of Optical Module

FIG. 9 is a sectional view of optical module 400 according to Embodiment 2 of the present invention. In FIG. 9, hatching of optical receptacle main body 121 and filter 122 is omitted to illustrate light paths.

As illustrated in FIG. 9, optical module 400 includes photoelectric conversion device 410 and optical receptacle 420. As described above, in the present embodiment, the size of end surface 140a of the core of optical transmission member 140 is smaller than the size of light-emitting surface 112a of light-emitting element 112.

Photoelectric conversion device 410 includes substrate 111, light-emitting element 112, and light-receiving element 113. In the present embodiment, light-emitting element 112 is disposed to face second optical surface 124, and light-receiving element 113 is disposed to face third optical surface 125.

Optical receptacle 420 includes optical receptacle main body 121 and filter 422. Optical receptacle main body 121 has the same structure as optical receptacle main body 121 of Embodiment 1 except that the functions of second optical surface 124 and third optical surface 125 are different from those of optical receptacle main body 121 of Embodiment 1.

In the present embodiment, second optical surface 124 faces light-emitting element 112, and allows the light of the second wavelength emitted from light-emitting surface 112a of light-emitting element 112 to enter optical receptacle main body 121. Second optical surface 124 is disposed such that second central axis CA2 of second optical surface 124 is tilted with respect to first light axis LA2 of light-emitting element 112.

In the present embodiment, third optical surface 125 faces light-receiving element 113, and emits, toward light-receiving surface 113a of light-receiving element 113, the light of the first wavelength that has travelled inside optical receptacle 120. Third optical surface 125 is disposed such that third central axis CA3 of third optical surface 125 is tilted with respect to second light axis LA3 of light-receiving element 113.

Filter 122 includes first filter surface 128 and second filter surface 129. In the present embodiment, filter 122 is disposed on optical receptacle main body 121 such that second filter surface 129 makes intimate contact with reflecting surface 126. When second filter surface 129 is in intimate contact with reflecting surface 126, reflecting surface 126 and second filter surface 129 reflect the light of the second wavelength and allow the light of the first wavelength to pass therethrough. In the present embodiment, the cross-sectional shape of filter 122 is a trapezoid, and first filter surface 128 and second filter surface 129 are disposed on the surface corresponding to the leg of the trapezoid.

In the present embodiment, second filter surface 129 is in intimate contact with reflecting surface 126, and reflecting surface 126 and second filter surface 129 are disposed on the intersection of first central axis CA1 of first optical surface 123 and second central axis CA2 of second optical surface 124. In addition, first filter surface 128 is disposed on the intersection of first central axis CA1 of first optical surface 123 and third central axis CA3 of third optical surface 125. Reflecting surface 126 and second filter surface 129 reflect, toward first optical surface 123, the light of the second wavelength entered from second optical surface 124, and allow, to pass therethrough toward first filter surface 128, the light of the first wavelength entered from first optical surface 123. First filter surface 128 reflects, toward third optical surface 125, the light of the first wavelength that has passed through second filter surface 129.

In the present embodiment, the light of the first wavelength entered from first optical surface 123 passes through reflecting surface 126 and second filter surface 129. The light that has passed through reflecting surface 126 and second filter surface 129 is reflected by first filter surface 128 toward third optical surface 125, and is emitted from third optical surface 125 toward light-receiving surface 113a of light-receiving element 113. The light emitted from light-emitting surface 112a of light-emitting element 112 enters optical receptacle 120 from second optical surface 124. The light having entered optical receptacle 120 is reflected by reflecting surface 126 (second filter surface 129) toward first optical surface 123, and is emitted from first optical surface 123 toward end surface 140a of the core of optical transmission member 140.

Now, the arrangement of light-emitting element 112 with respect to optical transmission member 140 and the arrangement of light-receiving element 113 with respect to optical transmission member 140 are described. As illustrated in FIG. 9, the light path between light-emitting surface 112a of light-emitting element 112 and end surface 140a of the core of optical transmission member 140 is referred to as third light path OP3, and the light path between end surface 140a of the core of optical transmission member 140 and light-receiving surface 113a of light-receiving element 113 is referred to as fourth light path OP4. In the present embodiment, as described above, the size of end surface 140a of the core of optical transmission member 140 is smaller than the size of light-emitting surface 112a of light-emitting element 112. Accordingly, light-emitting element 112 is disposed to face second optical surface 124 such that third light path OP3 is shorter than fourth light path OP4. The light emitted from end surface 140a of the core of optical transmission member 140 passes through fourth light path OP4 and reaches light-receiving element 113. On the other hand, the light emitted from light-emitting surface 112a of light-emitting element 112 passes through third light path OP3 and reaches end surface 140a of the core of optical transmission member 140. Since third light path OP3 is shorter than fourth light path OP4, the light coupling efficiency with respect to end surface 140a of the core of optical transmission member 140 can be maintained even in the case where light-emitting surface 112a of light-emitting element 112 is larger than end surface 140a of the core of optical transmission member 140.

Note that, also in optical module 400 according to the present embodiment, second optical surface 124 may be disposed such that second central axis CA2 of second optical surface 124 is parallel to first light axis LA2 and that second central axis CA2 of second optical surface 124 does not coincide with first light axis LA2. In addition, in this case, it may be disposed such that third central axis CA3 of third optical surface 125 is parallel to second light axis LA3 and that third central axis CA3 of third optical surface 125 does not coincide with second light axis LA3.

Effect

As described above, optical module 400 according to the present embodiment provides an effect similar to that of optical module 100 according to Embodiment 1.

INDUSTRIAL APPLICABILITY

The optical receptacle and the optical module according to the embodiments of the present invention are suitable for optical communications using an optical transmission member, for example.

REFERENCE SIGNS LIST 100, 200, 300, 400 Optical module
110, 210, 310, 410 Photoelectric conversion device
111 Substrate
112 Light-emitting element
112a Light-emitting surface
113 Light-receiving element
113a Light-receiving surface
120, 220, 320, 420 Optical receptacle
121, 221, 321 Optical receptacle main body
122, 222, 322, 422 Filter
123 First optical surface
124 Second optical surface
125 Third optical surface
126 Reflecting surface
127 Positioning part
128 First filter surface
129 Second filter surface
140 Optical transmission member
140a End surface of core
142 Ferrule
CA1 First central axis
CA2 Second central axis
CA3 Third central axis
LA1 Light axis of end surface of optical transmission member (Light axis of light emitted from optical transmission member)
LA2 First light axis (Light axis of light emitted from light-emitting element)
LA3 Second light axis

What is claimed is:

1. An optical receptacle configured to optically couple an optical transmission member, a light-emitting element and a light-receiving element when the optical receptacle is disposed between the optical transmission member configured to emit light of a first wavelength and a photoelectric conversion device including the light-emitting element and the light-receiving element, the light-emitting element being configured to emit light of a second wavelength different from the first wavelength, the light-receiving element being configured to receive the light of the first wavelength, the optical receptacle comprising:
 an optical receptacle main body; and
 a filter disposed on the optical receptacle main body,
 wherein the optical receptacle main body includes:
  a first optical surface configured to allow incidence of the light of the first wavelength emitted from the optical transmission member, or to emit, toward the optical transmission member, the light of the second wavelength that has travelled inside the optical receptacle main body,
  a second optical surface configured to emit, toward the light-receiving element, the light of the first wavelength that has travelled inside the optical receptacle main body, or to allow incidence of the light of the second wavelength emitted from the light-emitting element,
  a third optical surface disposed at a position farther from the first optical surface than the second optical surface, the third optical surface being configured to emit, toward the light-receiving element, the light of the first wavelength that has travelled inside the optical receptacle main body, or to allow incidence of the light of the second wavelength emitted from the light-emitting element, and
  a reflecting surface disposed on a light path between the first optical surface and the second optical surface, the reflecting surface being configured to internally reflect, toward the first optical surface, the light of the second wavelength entered from the second optical surface, or to internally reflect, toward the second optical surface, the light of the first wavelength entered from the first optical surface,
 wherein the second optical surface is disposed such that a second central axis of the second optical surface does not coincide with a first light axis of the light-emitting element or a second light axis of the light-receiving element,
 wherein the third optical surface is disposed such that a third central axis of the third optical surface does not coincide with the first light axis or the second light axis,
 wherein the filter includes:
  a first filter surface disposed in one surface of the filter, the first filter surface being configured to reflect the light of the first wavelength and to allow the light of the second wavelength to pass through the first filter surface, and
  a second filter surface disposed in another surface of the filter, the second filter surface being configured to reflect the light of the second wavelength and to allow the light of the first wavelength to pass through the second filter surface, wherein when the second optical surface emits the light of the first wavelength toward the light-receiving element, or when the third optical surface allows incidence of the light of the second wavelength:

the filter is disposed on the optical receptacle main body such that the first filter surface makes intimate contact with the reflecting surface, the second filter surface reflects, toward the first optical surface, the light of the second wavelength entered from the third optical surface, and the reflecting surface and the first filter surface reflect, toward the second optical surface, the light of the first wavelength entered from the first optical surface, or allow, to pass through the reflecting surface and the first filter surface toward the first optical surface, the light of the second wavelength reflected by the second filter surface, wherein when the second optical surface allows incidence of the light of the second wavelength, or when the third optical surface emits, toward the light-receiving element, the light of the first wavelength:

the filter is disposed on the optical receptacle main body such that the second filter surface makes intimate contact with the reflecting surface, and the reflecting surface and the second filter surface reflect, toward the first optical surface, the light of the second wavelength entered from the second optical surface, or allow, to pass through the reflecting surface and the second filter surface toward the first filter surface, the light of the first wavelength entered from the first optical surface, and wherein the first filter surface reflects, toward the third optical surface, the light of the first wavelength that has passed through the second filter surface.

2. The optical receptacle according to claim 1,
wherein the second optical surface is disposed such that the second central axis is tilted with respect to the first light axis or the second light axis, or that the second central axis and the first light axis or the second light axis are parallel to each other and do not coincide with each other; and wherein the third optical surface is disposed such that the third central axis is tilted with respect to the first light axis or the second light axis, or that the third central axis and the first light axis or the second light axis are parallel to each other and do not coincide with each other.

3. An optical module, comprising:
a photoelectric conversion device including a substrate, a light-emitting element disposed on the substrate, and a light-receiving element disposed on the substrate; and
the optical receptacle according to claim 1,
wherein the light-emitting element is disposed such that the first light axis of the light-emitting element is parallel to a normal to a surface of the substrate, and
wherein the light-receiving element is disposed such that the second light axis of the light-receiving element is parallel to the normal to the surface of the substrate.

4. The optical module according to claim 3,
wherein when a size of an end surface of a core of the optical transmission member that is used in combination with the optical module is equal to or greater than a size of a light-emitting surface of the light-emitting element:

the light-emitting element is disposed on the substrate such that the light-emitting element faces the third optical surface, the light-receiving element is disposed on the substrate such that the light-receiving element faces the second optical surface, and the filter is disposed on the optical receptacle main body such that the first filter surface makes intimate contact with the reflecting surface, and wherein when the size of the end surface of the core of the optical transmission member is smaller than the size of the light-emitting surface of the light-emitting element:

the light-emitting element is disposed on the substrate such that the light-emitting element faces the second optical surface, the light-receiving element is disposed on the substrate such that the light-receiving element faces the third optical surface, and the filter is disposed on the optical receptacle main body such that the second filter surface makes intimate contact with the reflecting surface.

5. An optical module, comprising:
a photoelectric conversion device including a substrate, a light-emitting element disposed on the substrate, and a light-receiving element disposed on the substrate; and
the optical receptacle according to claim 2,
wherein the light-emitting element is disposed such that the first light axis of the light-emitting element is parallel to a normal to a surface of the substrate, and
wherein the light-receiving element is disposed such that the second light axis of the light-receiving element is parallel to the normal to the surface of the substrate.

6. The optical module according to claim 5,
wherein when a size of an end surface of a core of the optical transmission member that is used in combination with the optical module is equal to or greater than a size of a light-emitting surface of the light-emitting element:

the light-emitting element is disposed on the substrate such that the light-emitting element faces the third optical surface, the light-receiving element is disposed on the substrate such that the light-receiving element faces the second optical surface, and the filter is disposed on the optical receptacle main body such that the first filter surface makes intimate contact with the reflecting surface, and wherein when the size of the end surface of the core of the optical transmission member is smaller than the size of the light-emitting surface of the light-emitting element:

the light-emitting element is disposed on the substrate such that the light-emitting element faces the second optical surface, the light-receiving element is disposed on the substrate such that the light-receiving element faces the third optical surface, and the filter is disposed on the optical receptacle main body such that the second filter surface makes intimate contact with the reflecting surface.

* * * * *